No. 766,140. PATENTED JULY 26, 1904.
H. M. ELDRIDGE.
HARNESS HOOK.
APPLICATION FILED SEPT. 22, 1903.
NO MODEL.

Witnesses.
E. A. Volk.
J. W. Snyder Jr.

Herbert M. Eldridge Inventor.
By Wilhelm Bonner
Attorneys.

No. 766,140. Patented July 26, 1904.

UNITED STATES PATENT OFFICE.

HERBERT M. ELDRIDGE, OF NIAGARA FALLS, CANADA, ASSIGNOR, BY DIRECT AND MESNE ASSIGNMENTS, TO NIAGARA FALLS METAL STAMPING WORKS, OF NIAGARA FALLS, NEW YORK, A CORPORATION OF NEW YORK.

HARNESS-HOOK.

SPECIFICATION forming part of Letters Patent No. 766,140, dated July 26, 1904.

Application filed September 22, 1903. Serial No. 174,170. (No model.)

*To all whom it may concern:*

Be it known that I, HERBERT M. ELDRIDGE, a citizen of the United States, residing at Niagara Falls, in the Province of Ontario, Canada, have invented new and useful Improvements in Harness-Hooks, of which the following is a specification.

This invention relates to hooks for use on harness and for other purposes.

The object of the invention is to produce a hook of simple, strong, and inexpensive construction which can be quickly and without difficulty attached to and detached from a link, ring, or other device, but which it is practically impossible to unintentionally disengage from such link or device by the movements of the hook and link or device in use.

Figure 1:
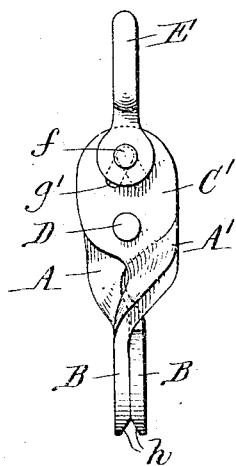
Figure 2:
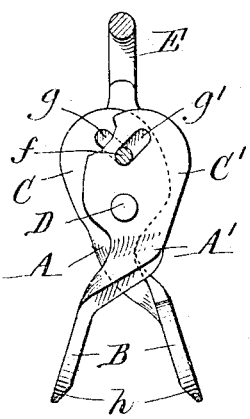
Figure 3:
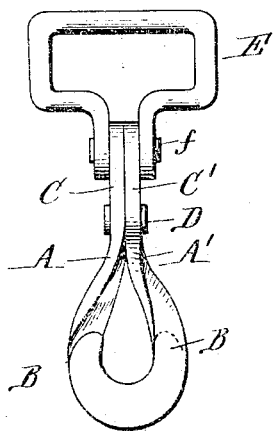
Figure 4:
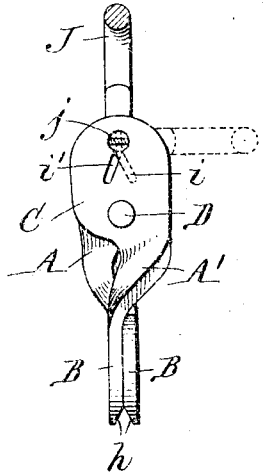

In the accompanying drawings, Figure 1 is a side elevation of a hook embodying the invention with the hook members together or in closed position. Fig. 2 is a view showing the hook members in side elevation and separated or opened and the strap-loop in section. Fig. 3 is a front elevation of the hook. Fig. 4 is a side elevation, partly in section, showing a hook of somewhat different construction.

Like letters of reference refer to like parts in the several figures.

A A' represent two hook members, each of which is provided at one end with a hook B. The hooked ends of the members are arranged parallel or side by side, with the hooks overlapped and turned in opposite directions— that is, with the bill of one hook beside the shank of the other hook. The hook members are provided with shank portions C C', arranged parallel or side by side and in planes at right angles to the planes of the hooks B.

The hook members are pivotally connected intermediate of their ends by a rivet or the like D, passing through holes in the inner ends of the shank portions C C'. The pivotal axis is parallel with the planes of the hooks B, so that the hooks swing sidewise toward and from each other in a plane at right angles to the planes occupied by the hooks. The hook members are preferably formed from thin flat metal blanks, which are twisted between their ends to produce the described arrangement of the hooks and shank portions C C'.

E represents a loop or link by which the hook is attached to a strap, chain, or other connection. The loop is connected to the hook by a cross bar or pin *f*, which passes through oppositely-inclined slots *g g'* in the shank portions C C', respectively, of the hook members. When the hooks are together or in closed position, as shown in Fig. 1, the cross-bar of the strap-loop occupies the outer ends of the slots *g g'*, and the hooks cannot be separated or opened except by moving the cross-bar of the loop inwardly in the slots toward the pivot for the hook members. To engage the hook with a link, ring, or other device, the hooked ends of the members are separated, as shown in Fig. 2, and the link or device inserted between the two hooks and then turned at substantially right angles and engaged over the oppositely-directed hooks, after which the hooks are closed or moved together. To facilitate the attachment of the link or device, the hooked ends of the members are provided on their adjacent sides with oppositely inclined or beveled faces *h*. The hooks are easily forced apart by pressing the link or device between these beveled faces. The beveled faces also enable the finger to be inserted between the hooked ends of the members to separate the hooks to detach the link or device.

It is practically impossible to accidentally or unintentionally detach the hook from the link or other device when in use, for so long as the hook and link are under strain the cross-bar of the hook positively holds the hooked ends from separation, and if the loop is pressed toward the pivot for the members with sufficient force to partially separate the hooked ends there is extremely little likelihood of the link or other device being turned and moved in the proper manner to disengage it from the hooked ends.

As a further safeguard against the accidental detachment of the link or other device with which the hook is engaged, the hook can be constructed as shown in Fig. 4. In this form of the hook the inclined slots $i$ $i''$ in the shank portions of the members are narrow, except at their outer ends, which are substantially circular, and the cross bar or pin $j'$ of the loop J is of greater width in one direction than the width of the slots. When the slots and cross bar or pin are thus formed, the loop must be turned to a predetermined position—for instance, to the position indicated by dotted lines in Fig. 4—before the loop can be moved toward the pivot to separate the hooked ends.

I do not herein make claim to a hook composed of two pivoted members having oppositely-turned parallel hooked ends and a loop connected movably with said members to open and close the hooked ends; but

What I claim as my invention is—

1. The combination of two flat hollow members having shank portions arranged parallel, hooked ends arranged side by side with the hooks overlapped and turned in opposite directions in planes at right angles to the planes of the shank portions, and twisted portions connecting said shank and hooked end portions, a pivot connecting said shank portions with its axis parallel to the planes of the hooked ends, said shank portions having slots arranged at an angle to each other, and a loop having a portion passing through said slots and slidable therein toward and from said pivot to open and close said hooks, substantially as set forth.

2. The combination of two members having hooked ends arranged side by side with the hooks, overlapped and turned in opposite directions, and shank portions arranged parallel in planes at right angles to the planes of said hooked ends, and having slots arranged at an angle to each other and provided with end enlargements, a pivot connecting said shank portions, and a loop having a cross-bar passing through and slidable in said inclined slots, said cross-bar being of greater width in one direction than the width of said inclined slots, whereby it can be moved into the narrow portions of said slots only when turned to one position, substantially as set forth.

Witness my hand this 14th day of September, 1903.

HERBERT M. ELDRIDGE.

Witnesses:
MARY RUTLEDGE,
WILLIAM M. HARRIGAN.